US006989510B2

(12) United States Patent
Yamaoka et al.

(10) Patent No.: US 6,989,510 B2
(45) Date of Patent: Jan. 24, 2006

(54) NON-COPPER-PLATED SOLID WIRE FOR CARBON DIOXIDE GAS SHIELDED ARC WELDING

(75) Inventors: Yukio Yamaoka, Osaka (JP); Geun Chul Song, Changwon (KR); Yong Kim, Changwon (KR)

(73) Assignee: Kiswel Ltd., Changwon (KR)

( * ) Notice: Subject to any disclaimer, the term of this patent is extended or adjusted under 35 U.S.C. 154(b) by 0 days.

(21) Appl. No.: 10/379,060

(22) Filed: Mar. 4, 2003

(65) Prior Publication Data

US 2003/0164360 A1   Sep. 4, 2003

(30) Foreign Application Priority Data

Mar. 4, 2002   (KR)   .................... 10-2002-0011398

(51) Int. Cl.
  *B23K 35/02*   (2006.01)
(52) U.S. Cl. ................................. 219/145.1; 219/146.1
(58) Field of Classification Search ............ 219/145.1, 219/146.1, 146.52, 121.11
  See application file for complete search history.

(56) References Cited

U.S. PATENT DOCUMENTS

| 4,972,047 | A | * | 11/1990 | Puddle et al. ................ 219/118 |
| 5,821,500 | A | * | 10/1998 | Araki et al. ................. 219/155 |
| 5,858,479 | A | * | 1/1999 | Saito et al. .................. 427/580 |
| 6,054,675 | A | * | 4/2000 | Kurokawa et al. ......... 219/146.1 |
| 6,062,386 | A | * | 5/2000 | Inoue et al. ................. 206/397 |
| 6,079,243 | A | * | 6/2000 | Inoue et al. .................... 72/41 |

FOREIGN PATENT DOCUMENTS

| JP | 57-056170 | 4/1982 |
| JP | 07-090685 | 4/1995 |
| JP | 07-223087 | 8/1995 |
| JP | 07-328789 | 12/1995 |
| JP | 08-001370 | 1/1996 |
| JP | 08-019893 | 1/1996 |
| JP | 08-197278 | 8/1996 |
| JP | 09-070685 | 3/1997 |
| JP | 11-147174 | 6/1999 |
| JP | 11-199979 | 7/1999 |
| JP | 11-342494 | 12/1999 |
| JP | 2000-094178 | 4/2000 |
| JP | 2000-117484 | 4/2000 |
| JP | 2000-317679 | 11/2000 |

OTHER PUBLICATIONS

Standard JIS B 0601 : 2001, ISO 4287: 1997—contains Rz definition, 8 pages.
Translation of Rz—Letter from HANA & Company plus Korean definition, 1 pages.
JSA Web Store—Detailed Standard Information (ISO)—website information showing identical status between 601 JIS and 4287 ISO relating to Rz, 2 pages.

* cited by examiner

*Primary Examiner*—M. Alexandra Elve

(74) *Attorney, Agent, or Firm*—Reising, Ethington, Barnes, Kisselle, P.C.

(57) ABSTRACT

A non-copper-plated solid wire for $CO_2$ gas shielded arc welding. The non-copper-plated solid wire for $CO_2$ gas shielded arc welding with excellent feedability ensures a reduced amount of generated spatters when welded at a relatively low current area, resulting from controlling the ten point average roughness (Rz) of the wire surface to 0.10 to 9.00 $\mu$m and the Vickers micro-hardness of the wire surface (Hv(1g)) to 125 to 310. Therefore, the welding operation can be carried out with a high efficiency to produce a weld of good quality.

1 Claim, 1 Drawing Sheet

NON-COPPER-PLATED SOLID WIRE FOR CARBON DIOXIDE GAS SHIELDED ARC WELDING

BACKGROUND OF THE INVENTION

1. Field of the Invention

The present invention relates to a solid wire for carbon dioxide gas shielded arc welding which has no copper plating on the wire surface, and more particularly to a non-copper-plated solid wire for carbon dioxide gas shielded arc welding which has improved wire feeding property or feedability, resulting from controlling the roughness and micro-hardness of the wire surface.

2. Description of the Related Art

Recently, with the introduction of automatic welding systems, a solid wire for carbon dioxide ($CO_2$) gas shielded arc welding has widely been used in the fields of, in particular, steel frames, automobiles, ship and building construction.

As for a solid wire for such $CO_2$ gas shielded arc welding, it is usual to use a so-called copper-plated solid wire wherein copper is plated on the wire surface. The reason why copper is plated is to improve electric conductivity, wire feedability and corrosion resistance.

Due to the friction between a wire and a drawing die occurring in a drawing process at the time of wire manufacturing, a portion of copper plating is peeled away from the wire surface, and another portion of copper plating is deposited in the form of copper dust on dents of the wire surface.

During a welding operation, the copper dust falls from the wire surface and accumulates on a welding tip due to the friction between the wire and the welding tip. As a result, the welding tip is clogged, thereby causing welding instability and generating a large amount of spatters.

In addition to the copper dust, the copper plated wire has the following problems:

(1) The copper plating layer is more soft than the wire surface and thus the copper plating is inevitably peeled off from the wire surface due to the friction between the wire and the welding tip, thereby causing welding instability.

(2) Copper has a low melting point of 1,083° C. and thus is liable to be vaporized at a ultra high temperature during a welding operation, thereby generating a large amount of fumes.

In spite of these disadvantages of copper plated wires, copper plating on a wire surface has been considered to be inevitable for the purpose of improving electric conductivity.

In view of the foregoing, it is necessary to develop non-copper-plated wires capable of satisfying various characteristics including advantageous characteristics of copper-plated wires.

Meanwhile, wires without copper plating have been proposed, for example in Japanese Patent Registration No. 2682814 (arc welding wire), Japanese Patent Application Laid-Open Publication No. Hei.11-147174 (non-plating welding wire for steel) and 2000-94178 (welding wire without plating). These prior arts propose the use of at least one kind of lubricating powder such as $MOS_2$, $WS_2$, and C or the coating of lubricating oil on a wire surface, for the purpose of improving wire feedability.

Japanese Patent Application Laid-Open Publication No. 2000-117484 discloses a welding wire, on the wire surface, having a wavy part of ruggedness of a predetermined wavelength along the circumferential direction, which is excellent in an arc starting property, resulting from controlling peak intensity measured in the power spectrum to a desired value. Japanese Patent Application Laid-Open Publication No. 2000-317679 discloses a non-plating wire for arc welding and an arc welding method, in which an insulating inorganic powder having a small average grain diameter and an electrically conductive inorganic powder are stuck on the welding wire surface in predetermined amounts using water soluble macromolecule, thereby generating a reduced amount of fumes or spatters.

In addition, Japanese Patent Application Laid-Open Publication No. Hei.11-342494 discloses a solid wire for carbon dioxide gas arc welding, in which wire components, C, Si and Mn involved in spatter generation satisfy the following relationship: $(10C+2Si+Mn)=2.4$ to $5.25$ wt %, thereby generating a reduced amount of spatters.

The above wires have improvements as non-copper-plated wires but do not satisfy all characteristics desired as welding wires. In particular, in the case of coating fine powders on the wire surface in order to improve the properties of non-copper-plated wires, the powders coated on the wire surface inevitably causes the generation of fumes. Furthermore, because it is difficult to control the amount of the powders to be coated to an appropriate level, the powders are not uniformly coated on the wire surface, thereby generating an increased amount of spatters.

Meanwhile, in automatic welding, feedability of a welding wire is defined as the length of the wire emerging from the front end of a welding tip relative to that of the wire fed by the rotation of a feeding roller. Poor feedability may increase the length of arc and fluctuate a welding current in welding operation, thereby generating an increased amount of spatters.

In this regard, the amount of generated spatters may be used as a standard reflecting feedability of the welding wire.

SUMMARY OF THE INVENTION

Therefore, the present invention has been made in view of the above problems, and it is an object of the present invention to provide a non-copper-plated solid wire for $CO_2$ gas shielded arc welding exhibiting improved feedability, resulting from reducing the amounts of fumes and spatters due to the absence of copper plating.

In accordance with the present invention, the above object and other objects can be accomplished by the provision of a non-copper-plated solid wire for $CO_2$ gas shielded arc welding, in which the ten point average roughness (Rz) of the wire surface is 0.10 to 9.00 $\mu$m and the Vickers micro-hardness of the wire surface (Hv(1 g)) is 125 to 310.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENTS

Figure 1:
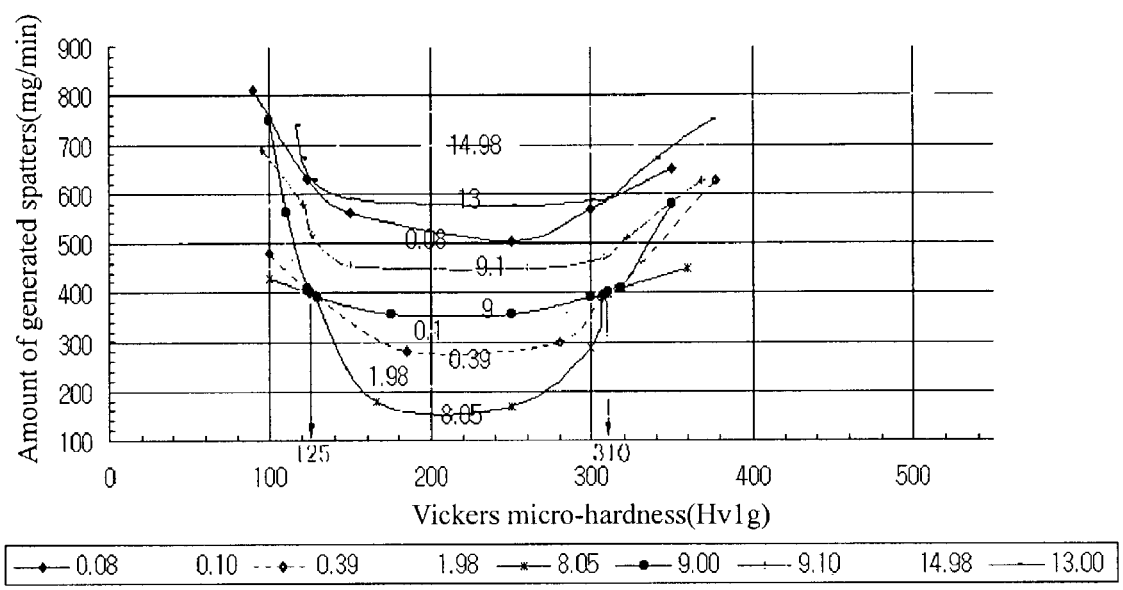
FIG. 1 is a graph showing the relationship between the Vickers micro-hardness and the amount of generated spatters according to the ten point average roughness.

The present inventors have tried to develop a non-copper-plated wire exhibiting superior feedability to a copper-plated wire in the absence of copper plating or applying powders as surface treating agents to the surface of the wire. As a result, they have found that the amount of generated spatters can be controlled by the adjustment of the Vickers micro-hardness and the ten point average roughness (Rz) of the wire surface, paying attention to the fact that the feedability quality of the wire depends on the amount of generated spatters in a welding operation.

In detail, where a non-copper plated solid wire for $CO_2$ gas shielded arc welding exhibits the ten point average roughness (Rz) of 0.10 to 9.00 μm and the Vickers micro-hardness (Hv( 1 g)) of 125 to 310, the amount of generated spatters is noticeably reduced, thereby exhibiting a good feedability. The ten point average roughness as used herein conforms to the known standard set forth by the Japanese Industrial Standard (JIS) and for International Standardization Organization (ISO). The standard Rz (JIS) translated into English is as follows:

"On standard measuring length of roughness curve, ten point height of roughness profile is a sum of the mean height of five highest profile peaks in order and the mean depth of five deepest profile valleys in order respectively."

The current Rz (ISO) standard is substantially identical to the current Rz (JIS) standard.

In the Vickers micro-hardness test, as already known, a diamond indenter, in the form of a pyramid with an angle of 136° between the opposite faces at the vertex, is pressed into the surface of the test piece using a prescribed force and, after the pressing force has been removed, the diagonal length of the indentation is measured. The term "Vickers micro-hardness (Hv)" as used herein is intended to mean the hardness represented as the pressing force divided by the surface area of the indentation, as the following equation:

$$Hv = \frac{2P}{d^2}\sin\frac{a}{2} = 1.854\frac{P}{d^2}$$

wherein, P is the pressing force (kg) and d is the diagonal length of the indentation (mm).

Hv(1 g) as used herein is intended to mean the Vickers micro-hardness measured using the pressing force of 1 g.

With respect to the ten point average roughness (Rz), in the profile curve showing wire surface roughness profile, the third highest peak and the third lowest valley of the profile on the basis of a centerline are selected within the wire length. The ten point average roughness (Rz) is defined, in microns, as the vertical distance between the third highest peak and third lowest valley of the profile.

Described hereinafter is the adjustment of the ten point average roughness and Vickers micro-hardness of the wire surface.

The manufacturing process of the wire is summarized as follows: starting wires (ROD) preparing, pickling, shot blasting, coating, dry drawing, degreasing, wet drawing and coiling. The ten point average roughness and Vickers micro-hardness of the wire surface can be controlled to the desired range of the present invention throughout the above processes.

Hereinafter, the respective processes will be described in detail in view of the adjustment of the ten point average roughness and Vickers micro-hardness of the wire surface.

In order to increase the ten point average roughness of the final welding wires, starting wires are electrolytic pickled with sulfuric acid (in-line) to remove oxide scales on the surfaces of the starting wires. At the same time, the surfaces of the starting wires may be etched by varying an applied current density, to thereby roughen the wire surfaces.

The pickled wires may be subjected to coating or shot blasting. The shot blasting sharply increases the roughness of the wire surfaces.

The coating, dry drawing and degreasing processes are conventional processes for wire manufacturing and have nothing to do with the characteristics of the present invention.

The Vickers micro-hardness of wire surfaces is mainly controlled by the wet drawing process as will be described hereinafter.

The Vickers micro-hardness of the wire surfaces generally increases as the tensile strength of the wires is higher. However, the increased tensile strength alone cannot increase the micro-hardness of the subsurface area ranging from several μm to several tens μm from the wire surfaces.

In this regard, area reduction in drawing dies can be considered. If the reduction angle (2α) of final drawing dies in the wet drawing process increases to a range of 8 to 40 degrees, the micro-hardness of the subsurface area ranging from several μm to several tens μm from the wire surfaces can be increased.

Larger drawing force in the drawing process may generate the die marks on the wires. In order to prevent this phenomenon, it is necessary to lower respective workabilities of the dies to 5 to 12% by adjustment of the number of the drawing.

In detail, in order to lower the workability of each die to 5 to 12%, if the reduction angles of final dies (2α) are 8 degrees, the number of the drawing is controlled to be 1 to 4 times, and if they are more than 8 degrees, the number of the drawing is controlled to be 2 to 5 times.

By way of example, in case of the dies with the reduction angle (2α) of 40 degrees, weak wet drawing processes of 2 to 5 times may prevent the occurrences of the die marks. At the same time, because the surface layers of the wires are mainly work hardened, hardness of the wire surface layers provided by the drawing process is added to the Vickers micro-hardness, which is proportional to the total workabilities of the wires. As a result, the Vickers micro-hardness of the wire surfaces preferably increases, whereby the surface hardness (Hv) of 300 or more is accomplished.

On the other hand, wires with the Vickers micro-hardness (Hv) as low as 100 can be obtained by carrying out the following processes in order: dry drawing, annealing, pickling and wet drawing.

The Vickers micro-hardness is also related to the tensile strength of the wires. Therefore, it is understood that the surface hardness may be controlled by varying the diameters of starting wires (ROD).

EXAMPLES

Hereinafter, the effectiveness of the present invention will be described by way of inventive examples and non-limiting comparative examples.

Respective starting wires (ROD) comprising, as chemical components for the wires, 0.06 wt % of C, 0.9 wt % of Si, 1.4 wt % of Mn, 0.014 wt % of P, 0.009 wt % of S, and 0.11 wt % of Ti, and having wire diameter sizes of 8 mm, 6.4 mm and 5.5 mm, were prepared. These wires were electrolytic pickled in 15% $H_2SO4$ solution at 45° C.

Some of the pickled wires were subjected to shot blasting others were not short blasted. The surface roughness of the wires was varied by different shot velocity such as slow, medium and fast in the shot blasting operation.

Then, the wires were coated with conventional phosphate (Bonderite) films and then with 15% Borax, followed by drying and coiling. Processes from the pickling to the coating were in-line processes.

Subsequently, the wires were subjected to dry drawing under conventional conditions to thereby obtain dry drawn wires with medium diameter sizes of 1.3 mm to 2.5 mm. The dry drawing was repeated 12 to 16 times at a rate of 600 m/min. The dry drawing dies were tungsten carbide dies.

The dry drawn wires were alkaline electrocleaned. Before the alkaline electrocleaning, lubricants of the surfaces of the wires were physically removed with steel wool.

In order to prepare some wires that had the low Vickers micro-hardness, the dry drawing was followed by intermediate annealing at 880° C. and electrolytic pickling.

In the final wet drawing, dies having reduction angles of 8, 12, 18, 25, 30, 35 and 40 degrees were used to control the Vickers micro-hardness of each wire. The final welding wires were 1.2 mm in diameter.

As the reduction angle ($2\alpha$) increases, area reduction percentages (workability) of the wet drawing dies decrease, as shown in Table 1. Therefore, the surface layers of the wires were mainly work-hardened and drawing forces were lowered, thereby preventing the generation of die marks.

TABLE 1

| Reduction angle ($2\alpha$) | Area reduction (%) |
|---|---|
| 8 | 18 |
| 12 | 16 |
| 18 | 12 |
| 25 | 8 |
| 30 | 5 |
| 35 | 5 |
| 40 | 5 |

By way of combining the process conditions as described above, various wires each having different surface roughness and Vickers micro-hardness were prepared. Each wire was welded under the welding conditions indicated in Table 2 and then the amount of generated spatters was determined.

TABLE 2

| Diameter of wire | Welding Voltage | Welding current | Welding speed | Shield gas | Welding position |
|---|---|---|---|---|---|
| 1.2 mm | 22 V | 160 Amp | 20 cm/min | $CO_2$ 100% (20 l/min) | Downward position |

Steel plates each having a thickness of 12 mm, a width of 10 cm and a length of 50 cm were placed in boxes measuring 80 cm×15 cm×20 cm. A 40 cm length of bead-on-plate welding was carried out for 2 minutes and then generated spatters were collected to thereby determine weight per unit time (mg/min).

The ten point average roughness (Rz) of each wire surface was calculated by averaging four roughness measurements taken around a circumference of the wire.

Similar to the measurement of the ten point average roughness, the Vickers micro-hardness (Hv) of the wire surfaces that were visualized under a microscope was calculated by averaging a total of 16 hardness measurements, that is, 4 measurements from each of 4 circumferences of the wire. The pressing force used was 1 g.

The amount of spatters generated depending on the Vickers micro-hardness (Hv) at various ten point average roughness (Rz) is presented in Table 3.

TABLE 3

| Example | Rz (μm) | Hv (1 g) | Amount of spatters (mg/min) | Amount of fumes (mg/min) | Remark |
|---|---|---|---|---|---|
| 1 | 0.08 | 90 | 810 | 0 | Comparative |
| 2 |  | 123 | 630 | 0 | examples |
| 3 |  | 150 | 560 | 0 |  |
| 4 |  | 250 | 505 | 0 |  |
| 5 |  | 300 | 570 | 0 |  |
| 6 |  | 350 | 650 | 0 |  |
| 7 | 0.10 | 95 | 610 | 0 |  |
| 8 |  | 122 | 405 | 0 |  |
| 9 |  | 125 | 400 | 0 | Inventive |
| 10 |  | 130 | 394 | 0 | examples |
| 11 |  | 175 | 330 | 0 |  |
| 12 |  | 250 | 325 | 0 |  |
| 13 |  | 306 | 389 | 0 |  |
| 14 |  | 310 | 400 | 0 |  |
| 15 |  | 315 | 407 | 0 | Comparative |
| 16 |  | 350 | 625 | 0 | examples |
| 17 |  | 378 | 718 | 0 |  |
| 18 | 0.39 | 100 | 480 | 0 |  |
| 19 |  | 122 | 406 | 0 |  |
| 20 | 0.39 | 125 | 398 | 0 | Inventive |
| 21 |  | 130 | 390 | 0 | examples |
| 22 |  | 185 | 280 | 0 |  |
| 23 |  | 280 | 300 | 0 |  |
| 24 |  | 306 | 390 | 0 |  |
| 25 |  | 310 | 400 | 0 |  |
| 26 |  | 316 | 406 | 0 | Comparative |
| 27 |  | 377 | 625 | 0 | examples |
| 28 | 1.98 | 75 | 475 | 0 |  |
| 29 |  | 100 | 450 | 0 |  |
| 30 |  | 122 | 404 | 0 |  |
| 31 |  | 125 | 400 | 0 | Inventive |
| 32 |  | 127 | 395 | 0 | examples |
| 33 |  | 200 | 210 | 0 |  |
| 34 |  | 290 | 311 | 0 |  |
| 35 |  | 306 | 390 | 0 |  |
| 36 |  | 315 | 408 | 0 | Comparative |
| 37 |  | 360 | 470 | 0 | examples |
| 38 | 8.05 | 100 | 428 | 0 |  |
| 39 | 8.05 | 122 | 405 | 0 | Comparative example |
| 40 |  | 127 | 397 | 0 | Inventive |
| 41 |  | 166 | 180 | 0 | examples |
| 42 |  | 250 | 168 | 0 |  |
| 43 |  | 300 | 289 | 0 |  |
| 44 |  | 307 | 392 | 0 |  |
| 45 |  | 310 | 399 | 0 |  |
| 46 |  | 316 | 406 | 0 | Comparative |
| 47 |  | 360 | 450 | 0 | examples |
| 48 | 9.00 | 100 | 750 | 0 |  |
| 49 |  | 110 | 560 | 0 |  |
| 50 |  | 123 | 408 | 0 |  |
| 51 |  | 125 | 400 | 0 | Inventive |
| 52 |  | 130 | 390 | 0 | examples |
| 53 |  | 175 | 355 | 0 |  |
| 54 |  | 250 | 357 | 0 |  |
| 55 |  | 300 | 389 | 0 |  |
| 56 |  | 308 | 393 | 0 |  |
| 57 |  | 310 | 400 | 0 |  |
| 58 | 9.00 | 318 | 408 | 0 | Comparative |
| 59 |  | 350 | 580 | 0 | examples |
| 60 | 9.10 | 95 | 688 | 0 |  |
| 61 |  | 121 | 580 | 0 |  |
| 62 |  | 126 | 518 | 0 |  |
| 63 |  | 150 | 455 | 0 |  |
| 64 |  | 260 | 448 | 0 |  |
| 65 |  | 308 | 470 | 0 |  |
| 66 |  | 322 | 510 | 0 |  |
| 67 |  | 368 | 625 | 0 |  |
| 68 | 13.00 | 116 | 740 | 0 |  |
| 69 |  | 120 | 670 | 0 |  |
| 70 |  | 127 | 625 | 0 |  |

TABLE 3-continued

| Example | Rz (μm) | Hv (1 g) | Amount of spatters (mg/min) | Amount of fumes (mg/min) | Remark |
|---|---|---|---|---|---|
| 71 |  | 150 | 590 | 0 |  |
| 72 |  | 250 | 575 | 0 |  |
| 73 |  | 300 | 585 | 0 |  |
| 74 |  | 310 | 590 | 0 |  |
| 75 |  | 340 | 670 | 0 |  |
| 76 |  | 375 | 750 | 0 |  |
| 77 | 14.90 | 110 | 800 | 0 | Comparative examples |
| 78 |  | 121 | 760 | 0 |  |
| 79 |  | 125 | 750 | 0 |  |
| 80 |  | 150 | 692 | 0 |  |
| 81 |  | 225 | 703 | 0 |  |
| 82 |  | 300 | 685 | 0 |  |
| 83 |  | 310 | 678 | 0 |  |
| 84 |  | 350 | 730 | 0 |  |

As shown in Table 4 below, in which the amount of generated spatters and the wire feedability are listed, the maximum amount of generated spatters giving acceptable feedability is 400 mg/min.

TABLE 4

| Amount of spatters (mg/min) | Feedability |
|---|---|
| 0–250 | Excellent |
| 250–400 | Good |
| 400–700 | Normal |
| 700–850 | Somewhat poor |
| 850 or more | Poor |

FIG. 1 is a graph illustrating the data of Table 3. It can be seen from FIG. 1 that only in case of wires having the ten point average roughness (Rz) of 0.10 to 9.00 μm and the Vickers micro-hardness (Hv(1 g)) of 125 to 310, the amount of generated spatters is 400 mg/min or less, thereby guaranteeing good feedability.

Welding wires are in firm contact with the inside of a feeding cable and the inside of a welding tip while being fed by a feeding roller. Therefore, it can be said that the roughness and/or hardness of the wire surface is intimately connected with the wire feedability. In detail, wire feedability is excellent only in specified surface roughness and hardness value ranges.

In particular, according to the present invention, wire feedability is closely related to the micro-hardness of the outermost surface layer of the wire measured under a micro pressing force, not to the total surface hardness of the wire that is proportional to the tensile strength of the wire.

Meanwhile, when a conventional copper-plated solid wire, JIS Z3312 YGW12 with 1.2 mm diameter was welded under a welding current of 250A, 5 to 6 mg of Cu fumes were generated. The Japanese Society of Occupational and Environmental Hygiene has not recommended a permissible concentration of copper fumes. However, according to papers presented at the meeting of the American Society of Occupational and Environmental Hygiene, the permissible concentration of copper fumes is 0.2 mg/m$^3$.

In an actual welding operation, the generation of excess Cu fumes can be avoided by wearing an appropriate protective mask and using a suitable suction equipment. However, it can be understood that because non-copper-plated wires for welding are used in the present invention, it is not necessary to consider the generation of Cu fumes.

As apparent from the above description, the present invention provides a non-copper-plated solid wire for $CO_2$ gas shielded arc welding with excellent feedability, which generates a reduced amount of spatters when welded at a relatively low current area, resulting from controlling the ten point average roughness (Rz) of the wire surface to 0.10 to 9.00 μm and the Vickers micro-hardness of the wire surface (Hv(1 g)) to 125 to 310. Therefore, the welding operation can be carried out with high efficiency to produce a weld of good quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A non-copper plated and powderless solid wire for $CO_2$ gas shielded arc welding, in which the ten point average roughness (Rz) of the wire surface is 0.10 to 9.00 μm and the Vickers micro-hardness of the wire surface (Hv(1 g)) is 125 to 310.

* * * * *